(12) United States Patent
Rajabhau

(10) Patent No.: US 7,830,238 B2
(45) Date of Patent: Nov. 9, 2010

(54) ELECTROMAGNETIC CURRENT LIMITER DEVICE

(76) Inventor: Deo Prafulla Rajabhau, X-17, MIDC Bhosari, Pune 411 026 (IN)

(*) Notice: Subject to any disclaimer, the term of this patent is extended or adjusted under 35 U.S.C. 154(b) by 0 days.

(21) Appl. No.: 12/217,556

(22) Filed: Jul. 7, 2008

(65) Prior Publication Data
US 2009/0201118 A1    Aug. 13, 2009

(30) Foreign Application Priority Data
Feb. 12, 2008 (IN) .................. 305/MUM/2008

(51) Int. Cl.
- *H01F 17/04* (2006.01)
- *H01F 27/28* (2006.01)
- *H01F 27/24* (2006.01)

(52) U.S. Cl. .................. 336/221; 336/222; 336/214
(58) Field of Classification Search .................. None
See application file for complete search history.

(56) References Cited

U.S. PATENT DOCUMENTS

| | | | |
|---|---|---|---|
| 1,952,072 A * | 3/1934 | Jewell | 324/117 R |
| 2,472,980 A * | 6/1949 | Miller | 332/172 |
| 3,032,663 A * | 5/1962 | Tillman | 307/419 |
| 3,087,131 A * | 4/1963 | Babcock et al. | 336/133 |
| 4,117,524 A * | 9/1978 | Parton et al. | 361/19 |
| 4,160,966 A * | 7/1979 | Kennedy | 336/155 |
| 5,140,290 A * | 8/1992 | Dersch | 505/211 |
| 5,754,034 A * | 5/1998 | Ratliff et al. | 323/206 |
| 2004/0032315 A1* | 2/2004 | Illingworth | 336/212 |
| 2004/0135661 A1* | 7/2004 | Haugs et al. | 336/212 |
| 2005/0111436 A1* | 5/2005 | Liao et al. | 370/352 |
| 2006/0044105 A1* | 3/2006 | Darmann et al. | 336/DIG. 1 |
| 2007/0257762 A1* | 11/2007 | Sokolov | 336/212 |
| 2008/0111436 A1* | 5/2008 | Takehara et al. | 310/156.43 |
| 2008/0226817 A1* | 9/2008 | Lee | 427/130 |

* cited by examiner

*Primary Examiner*—Anh T Mai
*Assistant Examiner*—Mangtin Lian
(74) *Attorney, Agent, or Firm*—Robert P. Michal; Lucas & Mercanti, LLP

(57) ABSTRACT

An electromagnetic current limiter device comprising at least one ferromagnetic core having a central opening; at least one winding of electric conducting material wound on the core; a portion of said winding passing through said opening; an input terminal for receiving alternating current for supplying said alternating current to said winding; an output terminal for supplying current limited current to an external load; and a plurality of predetermined aligned magnetic domains defined in said core for limiting the current to said output terminal.

8 Claims, 9 Drawing Sheets

ELECTROMAGNETIC CURRENT LIMITER DEVICE

FIELD OF INVENTION

This invention relates to current limiters.

In particular, this invention relates to current limiters in alternating current circuits adapted for use during starting, stalling of AC motors or occurrence of overloads or faults in the electrical power system.

BACKGROUND OF THE INVENTION

With particular reference to the specification and the magnetic properties of materials the following terms are defined below:

Magnetic domain is a region within a material in which magnetic fields of atoms are grouped together and aligned. This means that the individual moments of the atoms are aligned with one another within the region and exhibit magnetization.

Ferromagnetic material is a material in which large numbers of magnetic domains are present. In an unmagnetized condition the magnetic domains in a ferromagnetic material are randomly oriented and the magnetic field strength of the piece of material is zero. When some of the magnetic domains within the material are aligned the ferromagnetic material becomes magnetized. As more domains become aligned the magnetic field of the material becomes stronger. When almost all the domains are in alignment the material is said to be magnetically saturated. When a material is magnetically saturated, additional amount of external magnetization force will cause a negligible increase in its magnetic field strength.

Magnetic field is a change in energy within a volume of space surrounding a magnet. A magnetic field consists of magnetic lines of force surrounding the magnet or an electrical conductor carrying current.

Magnetic flux is the total number of magnetic lines of force in a magnetic field.

Magnetic flux density is the number of magnetic lines of force cutting through a plane of a given area at right angles.

Permeability is the property of a material that describes the ease with which a magnetic flux is established in a piece of that material when an external magnetizing force is applied.

Current limiting in an electric circuit is the process of preventing current in excess of rated current from flowing in the circuit. Current limiting protects the equipment and the circuit wiring from damage caused by flow of high current.

Current Limiter is a device that when included in a circuit effectively limits the current flow within permissible limits.

Current limiting is used in electrical or electronic circuits for imposing an upper limit on the current that may be delivered to a load. This current limiting is carried out to protect the circuit from harmful effects due to short-circuit or similar problems in the load. This term is also used to describe the ability of an over current protective device like a fuse or a circuit breaker to reduce the peak current that flows in a circuit.

Existing Knowledge:

The simplest form of current limiter is a fuse. As the current exceeds the fuse's limits it blows thereby disconnecting the load from the source. This method is most commonly used for protecting house-hold and industrial power supply lines. A circuit breaker is another device used for current limiting. Compared to circuit breakers, fuses attain faster current limitation but their drawback however is that once a fuse is blown, it has to be replaced with a fresh fuse of the correct rating.

Electrical load like AC motors, lighting ballasts and the like can develop extremely high peak inrush currents as soon as the power supply is turned on. Without protection, the only limits on the amount of inrush current drawn are the line impedance, input rectifier drop, and capacitor equivalent series resistance.

High inrush current can affect electrical systems by blowing fuses and tripping circuit breakers unnecessarily. If inrush current protection is not in place, relays and fuses must be used that are rated higher than any possible inrush current. Inrush current can also cause pitted contacts on switches and relays due to the arcing of the contacts. Inrush current can be as high as 100 times the normal steady state current and normally lasts for less than ½ a normal 60 hertz cycle.

Inrush current protection can be provided by an active circuit that uses a combination of power resistors, thyristors, and triacs (A triac or triode for alternating current is an electronic component approximately equivalent to two silicon-controlled rectifiers/thyristors joined parallel but with the polarity reversed and with their gates connected together. This results in a bidirectional electronic switch which can conduct current in either direction when it is triggered). Active circuits are generally expensive and difficult to design. Another option for inrush current protection is a negative temperature coefficient (NTC) thermistor.

NTC-Thermistors are made from various metal oxides that are combined into a powdery mass and mixed with a plastic binding agent. NTC Thermistors at room temperatures offer high initial resistance to the inrush current. Due to the current load and subsequent heating the resistance of the thermistor drops to a few percentage of its resistance at room temperature. At turn on, it presents a high resistance to inrush current and quickly removes itself from the circuit allowing the electrical system to behave normally. NTC thermistor based current limiters are suitable only for low current applications and are not suitable for high current power circuits.

Other current limiting devices used in high current systems include thyristors, superconducting current limiters and fixed impedance inductors. Conventional Inductors with ferromagnetic or nonmagnetic cores are cost efficient, sturdy simple and reliable but are fixed impedance devices for a particular frequency and if kept continuously in circuit lead to running voltage drops under normal operations. The higher the value of the inductor impedance the better is the over-current control. But the normal running voltage drop increases proportionally. Switched inductors are not preferred due the switching time of switching devices. Large fixed impedance inductors will also lead to, fault hanging, wherein for high impedance faults the current is too low for protective relays to operate quickly and reliably.

Conventional fixed impedance inductors are built with windings wound on either a magnetic core or nonmagnetic core or a combination of the two. The permeability of the core is substantially constant for the magnetization from low to high saturation flux densities. This leads to a constant inductance value.

When a magnetic field is applied, a flux is forced through the soft ferromagnetic material. The flux is proportional to the magnetic field intensity. The ratio of flux density to the magnetic field intensity remains substantially constant. This ratio is called the permeability of the magnetic material (mu). Upon magnetization the unaligned fields rotate toward alignment in the direction of magnetization and the size of aligned field increases.

The value of mu for isotropic materials is nearly constant from low flux density to peak flux density. Inductors built employing constant permeability magnetic materials will have nearly constant inductance and inductive reactance for low and high currents at the same frequency.

There is thus a need for a current limiting proportional inductance device, which can be continuously in circuit, with very low impedance and voltage drop for normal currents, but responds to over-currents instantaneously, by building up high impedance without switching devices, so that the current limiting action is proportional to the over-current.

PRIOR ART

Some of the current limiters used in power circuits are described herein under:

U.S. Pat. No. 3,671,810 disclosed therein a "Saturated core transient current limiter". The current limiter consists of a saturate-able magnetic core material having a winding placed in series with the power source and the load. A permanent magnet provided, biases the magnetic core material into saturation for normal load currents. The core will be driven out of saturation by abnormally high load currents flowing through the winding, increasing the inductance opposing further increase in load current. As per this disclosure the permeability of the magnetic core is substantially constant for the magnetization from low to saturation flux densities. This leads to a constant inductance value causing nearly constant inductive reactance for low and high currents at the same frequency. This device will also create a voltage drop for normal current flows.

U.S. Pat. No. 3,927,350 discloses a "Self switched inductive fault current limiter". The device disclosed therein consists of a parallel connected inductance and capacitance with a normally closed switching device connected in parallel and placed in series with an electric power distribution system. The capacitive reactance of the capacitor is substantially higher than the inductive reactance of the inductor at normal load conditions. The switching device which is normally closed is opened in response to a fault current so that the reactor is inserted into the system to effect limitation of current level. The device disclosed relies upon a moving contact switch device operating against spring bias and is therefore slow acting, bulky and subject to wear and tear of the contact point. Also the current limiting action is not proportional to the over-current.

U.S. Pat. No. 4,714,974 discloses a current limiter comprising a contact means having at least two cooperating contacts, one of which is movable. The contact opens under the influence of short circuit current flow, increasing the resistance being inserted into the circuit. The device therein relies upon a moving contact and is therefore slow acting, bulky and subject to wear and tear of the contact point. Also the current limiting action is not proportional to the over-current.

U.S. Pat. No. 5,617,280 discloses a "Super conducting fault current limiter" The current limiting unit is constituted by a super conducting coil functioning as a first current limiting element formed in a non inductive winding manner and a super conducting coil functioning as a second current limiting element connected in parallel to the first current limiting element and having a predetermined impedance value. Super conducting coils have to be maintained at very low temperature and are not suitable for unmanned field installations and will require backup power and are not commercially viable.

U.S. Pat. No. 6,275,365 discloses a resistive fault current limiter, wherein bifilar pancake coils are electrically connected to adjacent pancake coils so that current flowing in adjacent turns of pancake coils flow in opposite directions. The super conducting fault current limiter is configured to provide minimum inductance and low resistance in the normal state of operation. When the fault current exceeds a predetermined threshold, the resistance increases to a level sufficient for limiting the flow of fault current to a desired level.

These super conducting coils have to be maintained at very low temperature and are not suitable for unmanned field installations and will require backup power and are not commercially viable.

U.S. Pat. No. 6,469,490 discloses a device for "Current limiting in power systems using Hall Effect device". A Hall Effect device is disposed between two magnetic field producing contacts and exhibits resistance which varies in accordance with an applied vertical magnetic field. Permeability of the Hall effect device is substantially constant for the magnetization from low to saturation flux densities. Also the current limiting action is not proportional to the over-current. This device will also create voltage drop for normal current flows.

US Patent Publication 2007/0257755 discloses a "Magnetic flux-coupling type super conducting fault current limiter". The super conducting coils need to be kept at a very low temperature to function effectively and are not suitable for unmanned field installations and will require backup power and are not commercially viable.

PCT Patent publication WO 2006/003111 discloses a "Magnetic circuit device." In this device the power required to magnetize or demagnetize strong permanent magnets is reduced by dividing the cross sections of the permanent magnets into a number of smaller magnets connected parallel to each other. By changing the inductance of the permanent magnet, the fault current flowing in the circuit is limited.

Providing number of small magnets creates a voltage drop for normal current flows due to the inductance of the permanent magnets.

In view of the above draw backs in the prior art there is a need to develop a better and efficient inductive current limiting device.

OBJECTS OF THE INVENTION

One of the objects of this invention is to provide an inductive current limiting device that can be continuously in circuit.

Another object of this invention is to provide an inductive current limiting device that has low impedance for normal currents.

Yet another object of this invention is to provide an inductive current limiting device that has a minimal voltage drop for normal currents.

Another object of this invention is to provide an inductive current limiting device in which the current limiting action is proportional to the over-current.

Yet another object of this invention is to provide an inductive current limiting device that responds to the over-currents instantaneously by building up a high impedance.

Yet another object of this invention is to provide an inductive current limiting device which returns to its rated low impedance instantaneously as the over current condition is resolved.

Another object of this invention is to provide an inductive current limiting device that has no moving contacts to switch from low impedance at normal current level to high impedance at over currents.

Yet another object of this invention is to provide an inductive current limiting device that can operate at ambient temperature conditions.

Another object of this invention is to provide an inductive current limiting device that is not dependent on super conductivity of conductors to limit fault currents in power circuits.

Another object of this invention is to provide an inductive current limiting device that is robust.

Another object of this invention is to provide an inductive current limiting device that can be installed in remote unmanned stations.

SUMMARY OF THE INVENTION

This invention discloses a current proportional incremental permeability electromagnetic current limiter (IPCL) utilizing the incremental permeability of radially pre-aligned magnetic domains in two soft ferromagnetic material cores (SFMC) enclosing a current carrying winding of conducting material.

According to the present invention there is provided an electromagnetic current limiter device comprising:
- (i) at least one ferromagnetic core having a central opening;
- (ii) at least one winding of electric conducting material wound on the core; a portion of said winding passing through said opening;
- (iii) an input terminal for receiving alternating current for supplying said alternating current to said winding;
- (iv) an output terminal for supplying current limited current to an external load; and
- (v) a plurality of predetermined, aligned magnetic domains defined in said core for limiting the current to said output terminal.

Typically, at least two ferromagnetic cores are provided for each phase of alternating current.

Typically, in an operative configuration of the device according to the present invention, said winding is adapted to induce a magnetic field in said core.

Typically, the magnetic field induced by said winding is concentric to said opening.

Typically, the induced magnetic field is proportional to said alternating current.

Typically, the magnetic field induced by said winding is proportional to the number of turns of said winding.

Typically, the high induced magnetic field strength induces rotation and growth of said predetermined aligned magnetic domains.

Typically, said core has permeability proportional to rotation and growth of said predetermined aligned magnetic domains.

Typically, the permeability of said core is proportional to said induced magnetic field.

Typically, said winding has inductance and inductive reactance proportional to the permeability of said core.

Typically, a low input alternating current induces a negligible rotation and growth of said predetermined aligned magnetic domains.

Typically, a high input alternating current induces rotation and growth of said predetermined aligned magnetic domains.

In accordance with the invention there is also provided a method of manufacturing the electromagnetic current limiter device comprising the following steps:
- a. providing a core of magnetic material having a central aperture;
- b. aligning the domains of the core material in the radial direction;
- c. winding an electrically conductive element through the aperture on the core for a predetermined number of turns to thereby form a winding; and
- d. providing an input terminal and an output terminal for said winding.

BRIEF DESCRIPTION OF THE ACCOMPANYING DRAWINGS

All the aspects and advantages of the present invention will become apparent with the description of the preferred, non-limiting embodiment, when read together with the accompanying drawings, in which.

Figure 8:
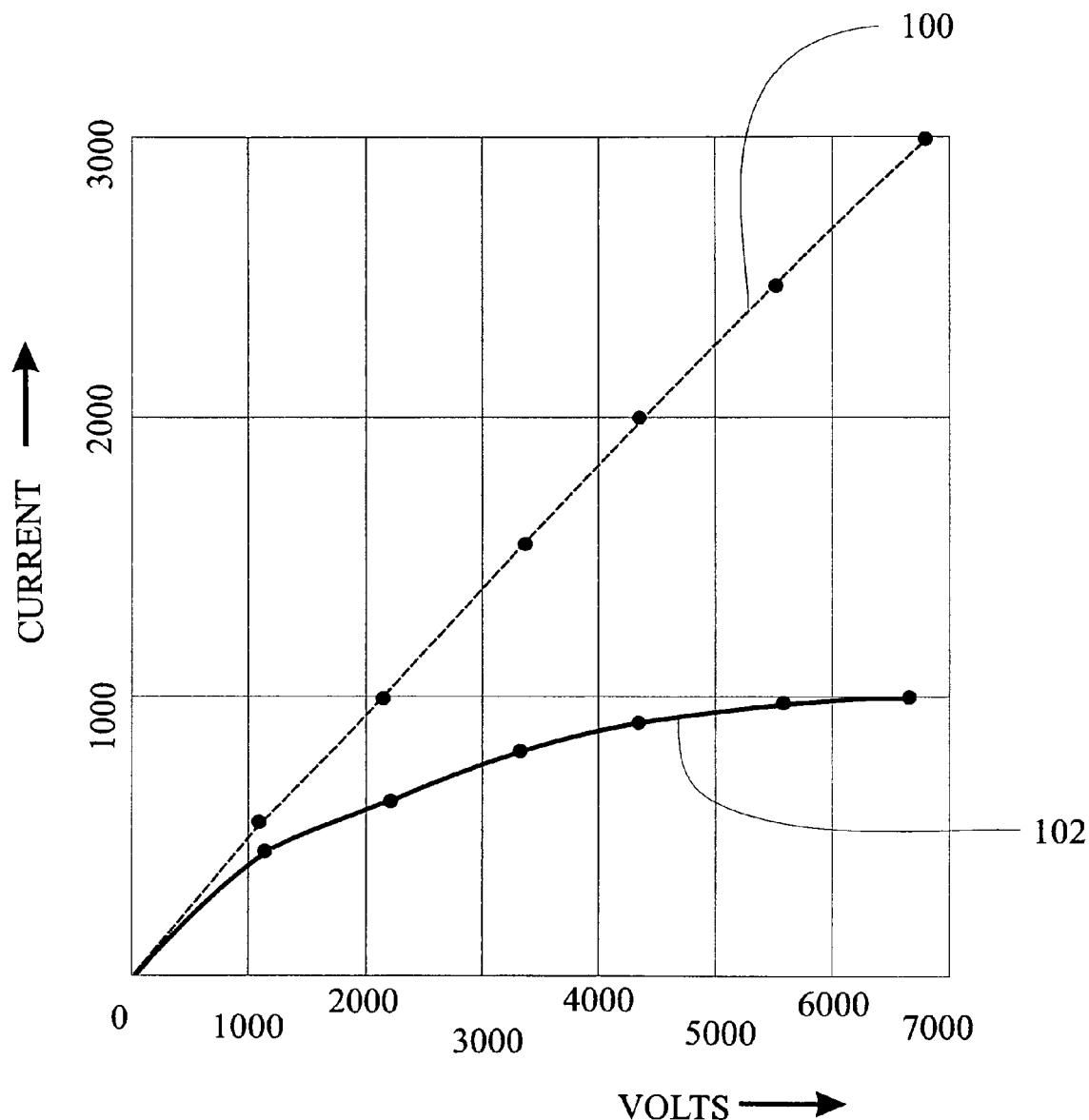
Figure 9:
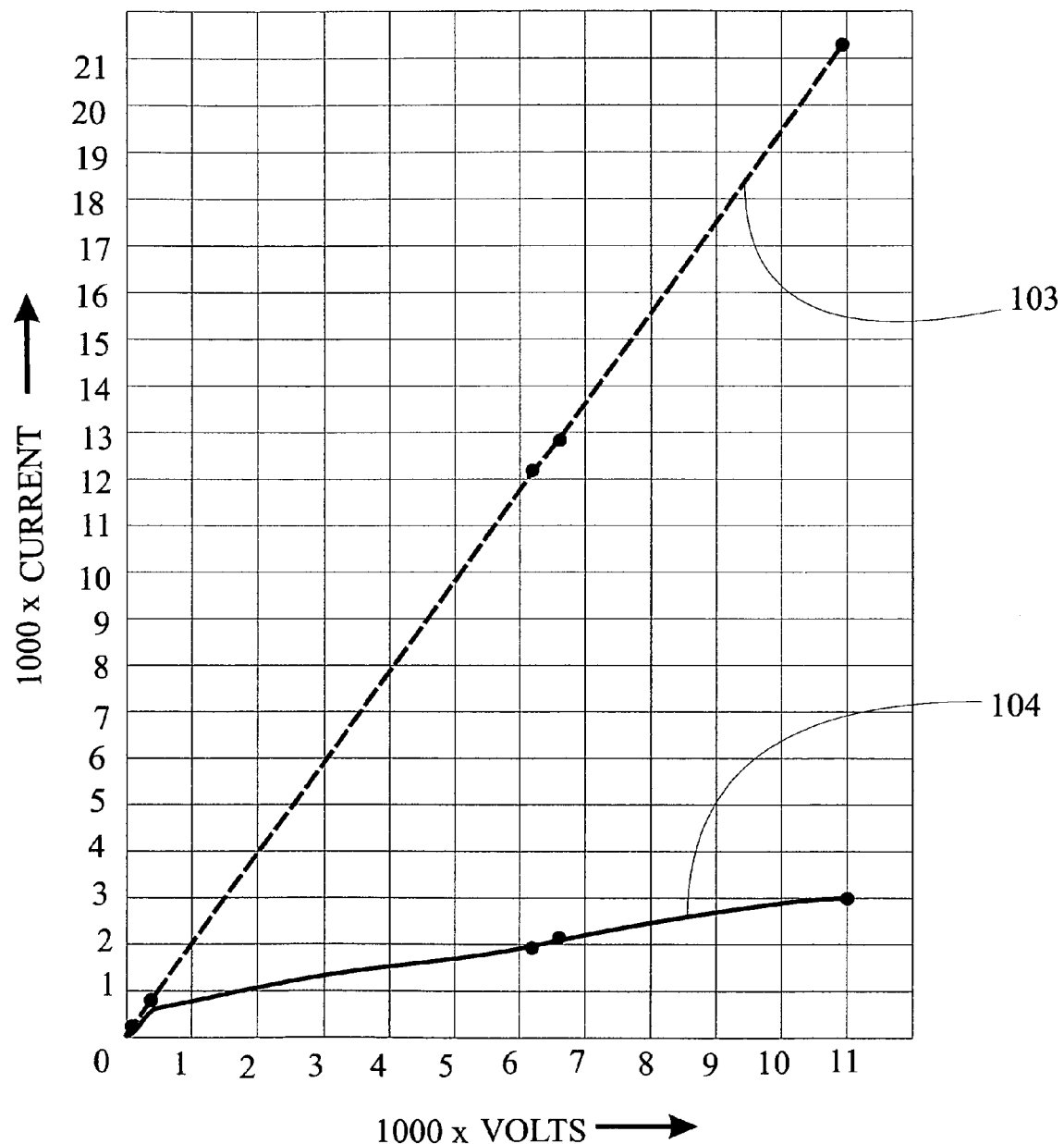

FIG. 8 is a graph of the no load short circuit test results of the Current Limiter device as per this invention, of nominal current rating of 500 amps, 6600 volts, 3 phase, 50Hz unit with voltage plotted on X axis and current plotted on Y axis; and FIG. 9 is a graph of the no load short circuit test results of the Current Limiter device as per this invention, of nominal current rating of 400 amps, 11000 volts, 3 phase, 50 Hz unit with voltage plotted on X axis and current plotted on Y axis.

DETAILED DESCRIPTION

Figure 1:
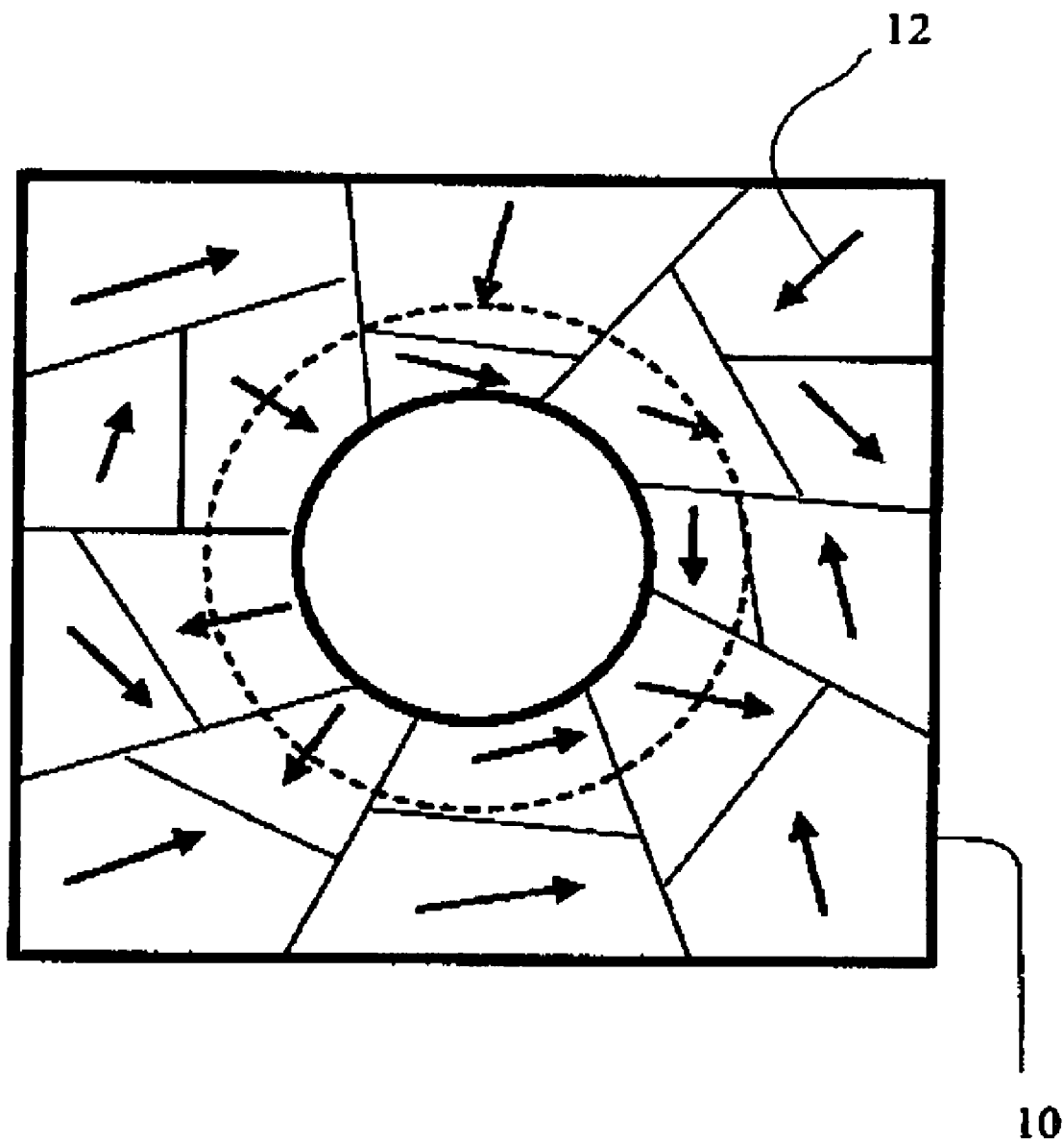
FIG. 1 is the cross sectional view of a soft magnetic core with randomly aligned magnetic domains with reference to the background art.

FIG. 1 of the accompanying drawings illustrates schematically a cross section of isotropic soft magnetic material core (SFMC) 10, wherein the magnetic domains 12 are randomly aligned so that the net alignment is nearly zero in the unmagnetized condition.

When a magnetic field of intensity H is applied a flux Phi is forced through the soft ferromagnetic material. The flux is proportional to the magnetic field intensity. The ratio of flux density B to the magnetic field intensity H remains substantially constant. This ratio is called the permeability of the magnetic material (mu). Upon magnetization the unaligned domains rotate toward alignment in the direction of magnetization and the size of aligned domains increases.

As stated earlier the value of mu for isotropic materials is nearly constant from low flux density to peak flux density. Inductors built employing constant permeability magnetic materials will have nearly constant inductance and inductive reactance for low and high currents at same frequency.

In the preferred embodiment, methods are disclosed for the construction of a current proportional incremental permeability inductive current limiter (IPCL).

Figure 2:
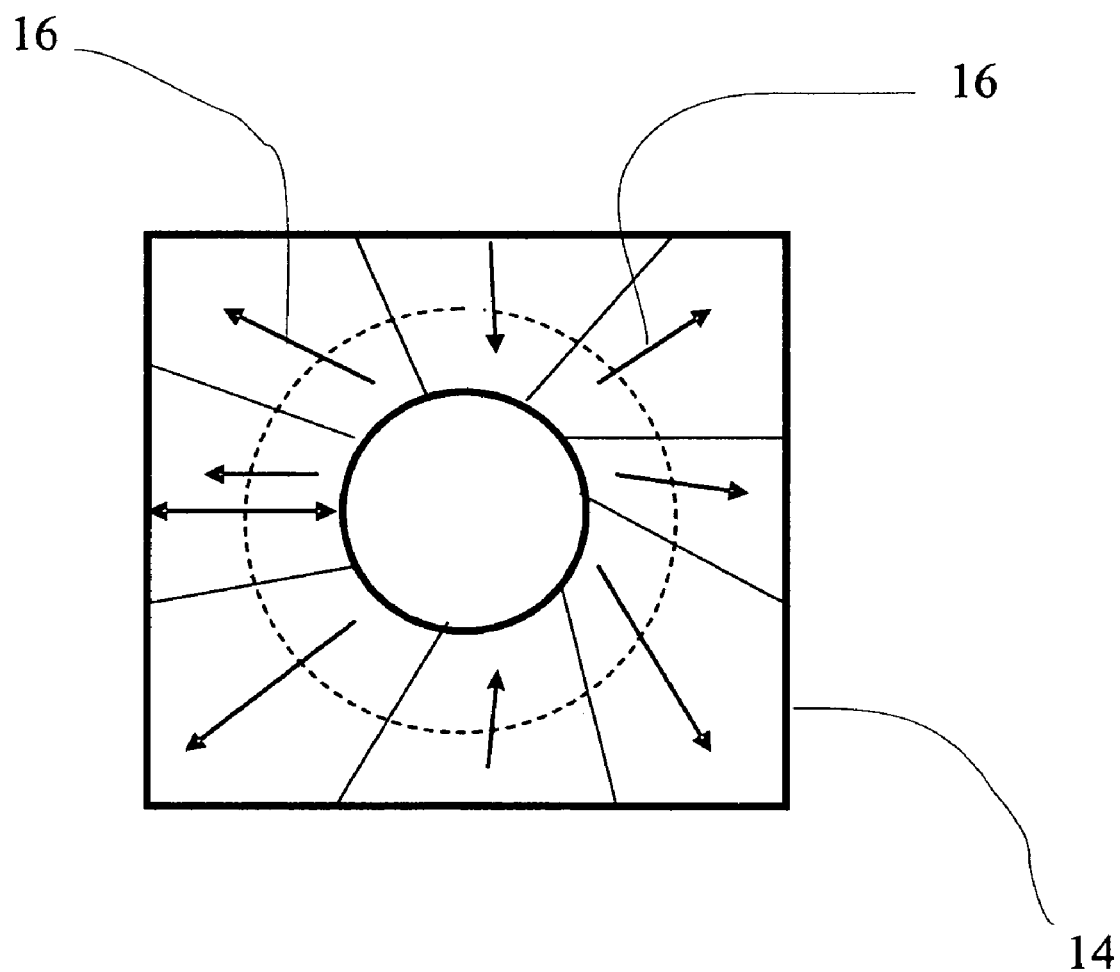
FIG. 2 is the cross sectional view of the soft magnetic core after cold working to achieve radially aligned magnetic domains in accordance with the preferred embodiment of this invention.

FIG. 2 illustrates a typical cross section of a cold worked incremental permeability soft magnetic core (IPSMC) 14, with radially aligned magnetic domains 16, in accordance with the present invention. The core laminations are made of materials of soft ferromagnetic materials like silicon steel, magnetic steel. The magnetic domains of the material of the laminations can be aligned in a preferred, predetermined orientation by any one or more of various processes like stamping, pressing and rolling. The pre alignment of the magnetic fields of the laminations is carried out until there is radial alignment of the magnetic domains.

Figure 3:
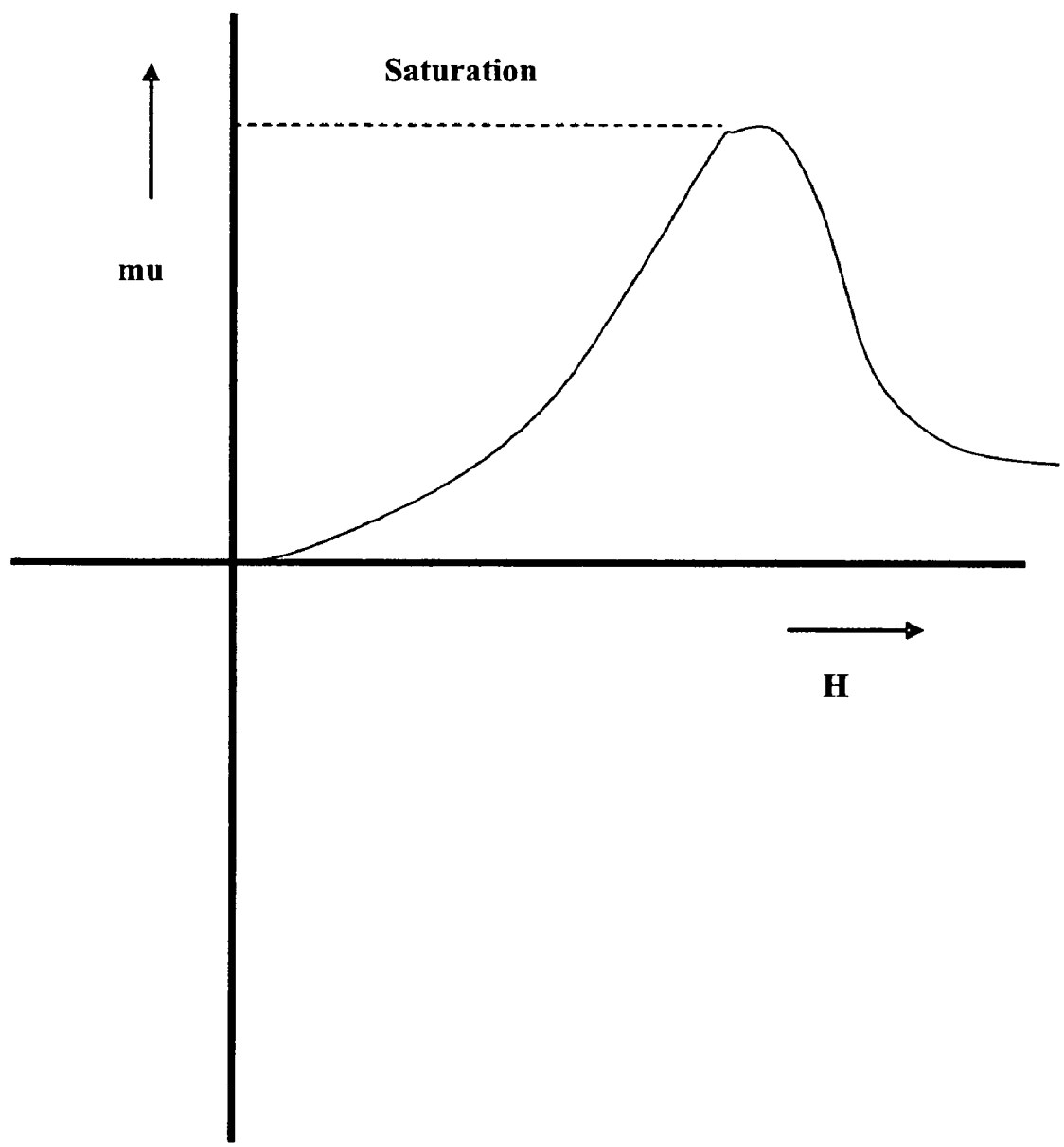
FIG. 3 illustrates the incremental permeability curve of the core in accordance with the preferred embodiment of this invention.

FIG. 3 illustrates the incremental relationship between the permeability mu of the IPSMC with respect to the magnetic field strength H. In the present invention the magnetic field strength H is in a direction perpendicular to the field of pre-alignment. For the radially pre-aligned domain condition as illustrated in FIG. 2 the circumferential direction is perpendicular to all the magnetic field directions. The permeability is low for low magnetic field strength H in the circumferential direction and increases with higher magnetic field strength H. As the magnetic domains are radially pre-aligned they do not move or grow with small value of circumferential H. For higher H values magnetic domain rotation and growth is achieved resulting into higher mu.

Figure 4:
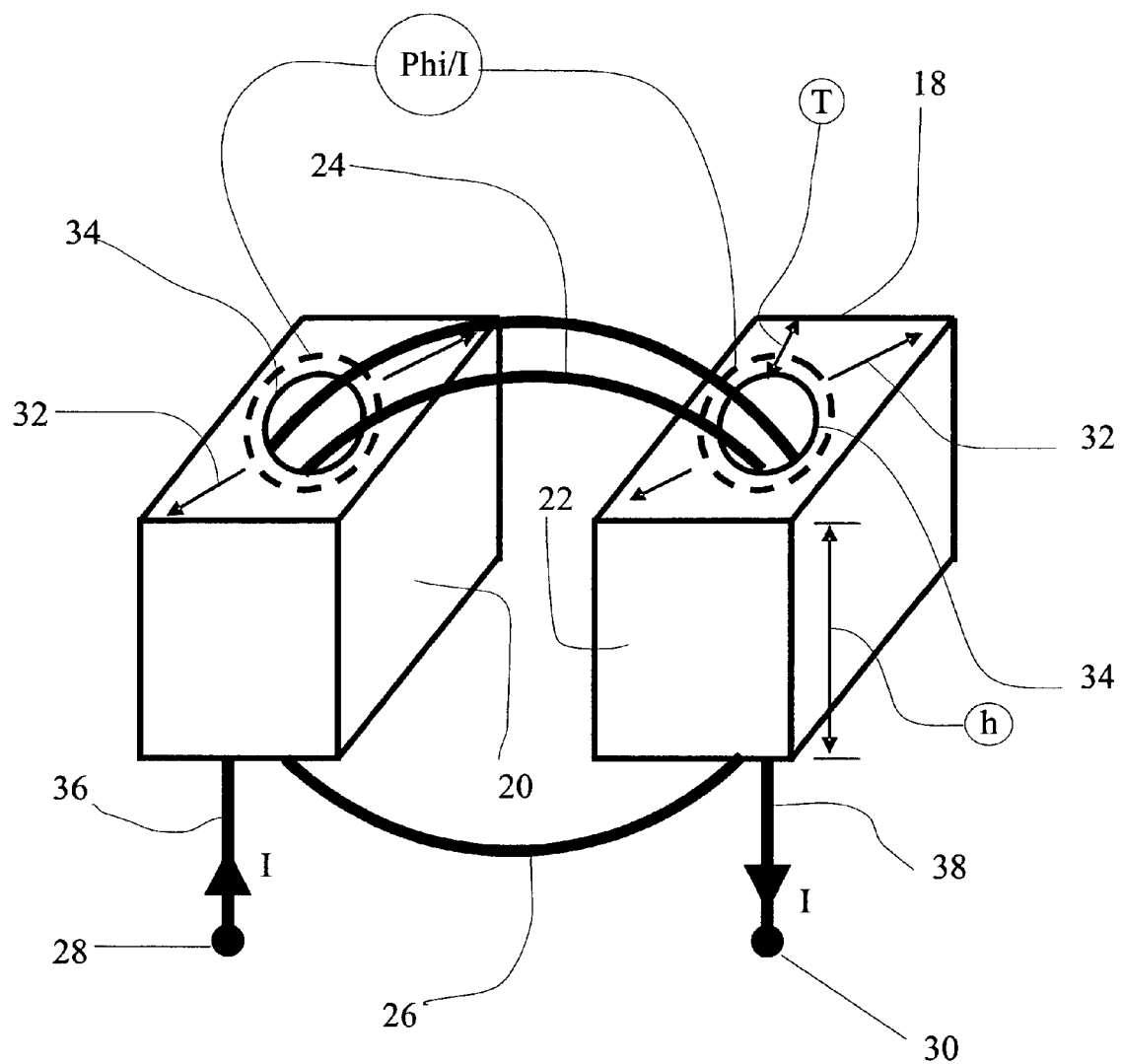
FIG. 4 illustrates the perspective view of the current proportional incremental permeability electromagnetic current limiter arrangement in accordance with the preferred embodiment of this invention.

FIG. 4 is a perspective view of one embodiment of the present invention wherein the Current proportional incremental permeability inductive current limiter (IPCL) 18 comprises; a coil 24, of electrically conducting material 26, incremental permeability soft ferromagnetic cores (IPSFC) 20 and 22 with central holes 34, with radially outward pre-aligned domains 32, enclosing the two coil sides 36, and 38, set of two terminals 28 and 30 for connecting the IPCL in series with an AC current (I) carrying conductor from the supply to the load.

When a current I passes through the coil 24, a magnetic field intensity H is produced as per the relationship $$H = N*I \quad (1)$$

where, N is the number of turns of the coil 24.

The direction of the magnetic field H is circumferential which forces a flux per unit current (Phi/I) through the IPSFC 20 and 22 as per the relationship $$(Phi/I) = (N*mu*h*T)/(Pi*D) \quad (2)$$

Where D is the effective mean diameter of the IPSFC, mu is the permeability of the IPSFC, h is the length of the core and T is dimension from the inner hole periphery to the outer diameter of the core. The terms N, D, h and T are constants for a particular dimension of winding and soft ferromagnetic core. Thus (Phi/I) is directly proportional to mu for a particular winding and core.

For values of current less than or equal to rated current the magnetic field intensity H is low and is not enough to align the magnetic fields domains in the IPSFC to the direction of magnetization resulting into low mu and low (Phi/I). For high values of current such as starting of AC motors or overloads or faults in the power system the magnetic field intensity H is high and sufficient to progressively align the magnetic domains with the direction of magnetization resulting into a higher mu and hence higher (Phi/I).

The inductance of the current carrying winding is $$L = N*(Phi/I) \quad (3)$$

For values of current less than or equal to rated current, (Phi/I) is low and hence inductance (L) is low. For high value of current (I), (Phi/I) is high, and consequently the winding inductance (L) is high.

The impedance (Z) offered by the IPCL device for alternating currents is governed by the equation $$Z = R + jX \quad (4)$$

where, R is the resistance of the winding and is negligible and X is the inductive reactance given by $$X = 2*pi*f*L. \quad (5)$$

where, f is the frequency of supply and L is the inductance of the winding.

The Current proportional incremental permeability electromagnetic current limiter device (IPCL) thus has a low inductive reactance (X) for low alternating currents and high inductive reactance (X) for high alternating currents. The IPCL device hence acts as a current limiter for alternating current circuits.

The important consideration for design of the current limiter device of this invention is the choice of inner hole diameter and number of turns so that the magnetic field intensity H for normal currents is low giving low permeability. Second important consideration for design is to choose the mean diameter D and radial thickness T such that the IPSFC does not saturate at the maximum current value.

The invention will now be described with reference to the following non limiting examples.

EXAMPLE 1

A current limiter unit of 28 amperes normal current rating was manufactured as per the present invention. The core laminations of 200×200 mm square were made of 0.5 mm thick soft ferromagnetic cold rolled non grain oriented silicon steel material. A central hole of 50 mm diameter was punched on the lamination in a 30 ton Press using aperture die set. These laminations were cold worked by a stamping the central region using a 40 kg impact hammer of 60 mm diameter. After each stroke the laminations were subjected to Ferro-fluid domain viewer testing to verify alignment and saturation of the magnetic domains. Ferro-fluid domain viewer is a suspension of fine iron particles in a transparent liquid encapsulated in a transparent membrane. When brought near the lamination the iron particles will align in the direction of the magnetic domains and indicate the direction of alignment. It was observed that after 5 strokes of impact stamping in the central region of the laminations the magnetic domains of the central area developed initially radially alignment. Increasing the number of strokes further did not improve the radial alignment of the magnetic domains.

The lamination was positioned on a smooth bed plate and located by the central hole. Thereafter a high pressure roller was pressed in the outward direction from the aperture to the periphery of the lamination to further enhance the radial alignment of the magnetic domains. Roller of 20 mm diameter was used and 100 kgf force was applied on 24 overlapping radial sectors of the lamination. The laminations were then subjected to Ferro-fluid domain viewer testing again and it was observed that the magnetic domains were completely radially aligned. One thousand such laminations were pressed together using a 30 ton press and treated with epoxy resin. Copper wire were wound over the lamination set and epoxy coated to form the current limiter of one phase. Two more such laminated core assemblies were prepared and located in a suitable enclosure provided with input and output terminals to form a current limiter unit of 28 amperes normal current rating.

A 20 H.P three phase induction AC motor of 980 rpm rated speed and a starter were connected along with an arrangement for measuring current drawn by each of the three phases. A preset load condition was created by connecting a fan load on the motor shaft. The starter was turned on and the starting current drawn by the R Y B phases of the motor were 185 amps each respectively. In a steady running condition the current drawn by each of the phases were 28 amperes.

Figure 5:
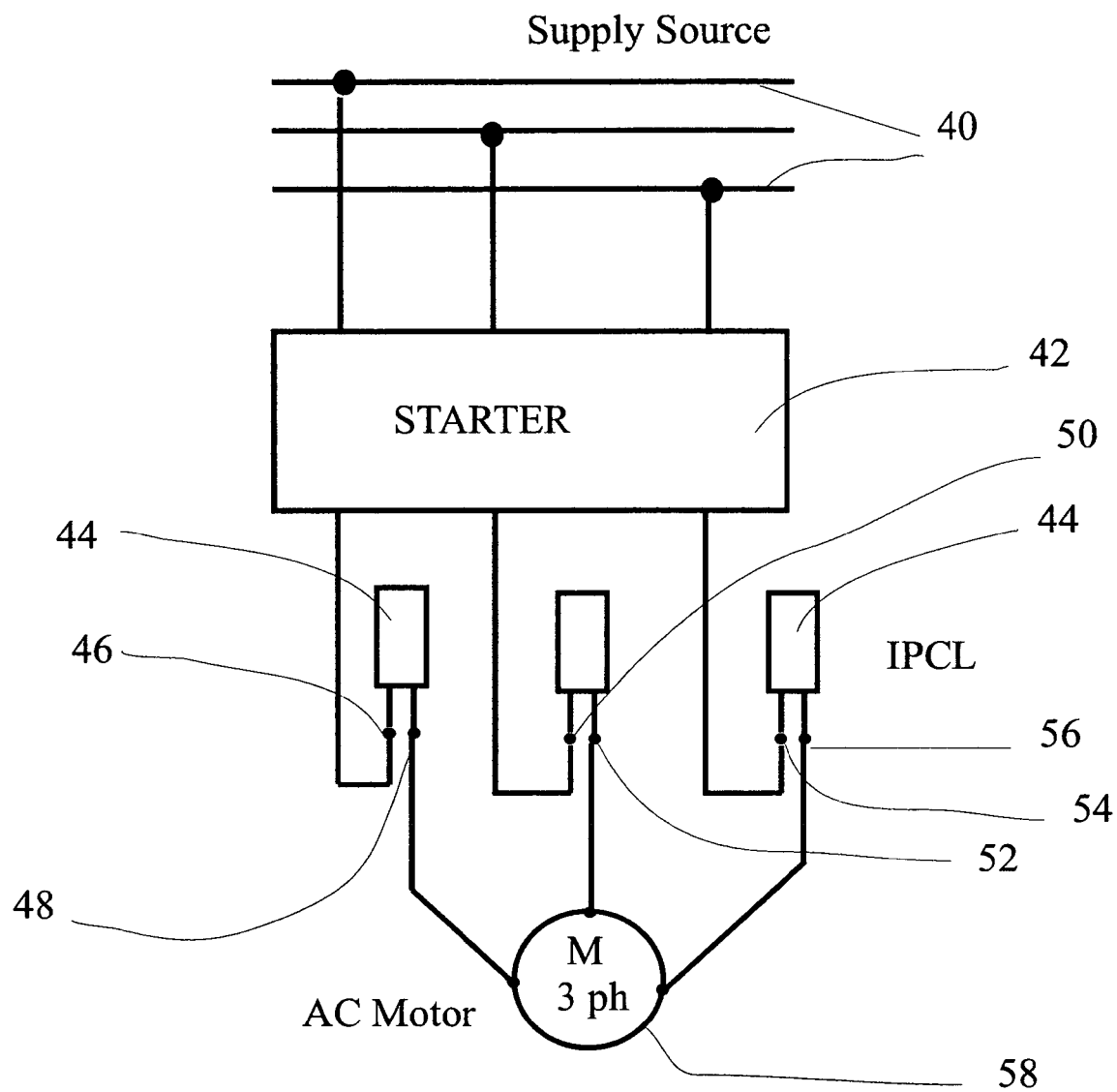
FIG. 5 illustrates the connection of the present invention as a soft starter and current limiter for AC motors.

The test rig was modified to include the current limiter device manufactured as per the invention. The 20 H.P three phase induction AC motor 58, of 980 rpm rated speed and a starter 42 was connected as shown in FIG. 5. A three phase supply source 40 was connected to one set of terminals of the starter 42 and the supply side terminals 46, 50 and 54 of the incremental permeability electromagnetic current limiter device (IPCL) was connected to the other set of terminals of the starter 42. The load side terminals of the current limiter device were connected to the terminals of the motor 58. The starter 42 was switched on and the starting currents drawn by the three phases were noted down for the same preset load condition of the motor. The starting currents as recorded were 70 amps in each of the R Y B phases. On steady running condition the current drawn by the R Y B phases were 28 amperes respectively.

The recorded readings clearly indicate that the starting current of the AC motor was limited to 70 amps as compared to a current of 185 amps that was drawn by the motor when the limiter device was not present in the system. The starting current drawn by the motor was limited by 66 percentage by the current limiter device of this invention. The running current of the motor was found to be unaltered at 28 amps.

The test results clearly indicate that the running current of the motor for a preset load remained same thus indicating that there was no current limiting action at the rated lower current conditions. These results establish that the current limiting device has increased reactance for higher currents and negligible reactance for normal currents.

EXAMPLE 2

Another test was carried out by connecting two three phase supply sources as in a tie line. A sudden 100 amps load on one power source was created and the supply current condition of the other source was recorded. The current was found to increase by 50 amperes.

Figure 6:
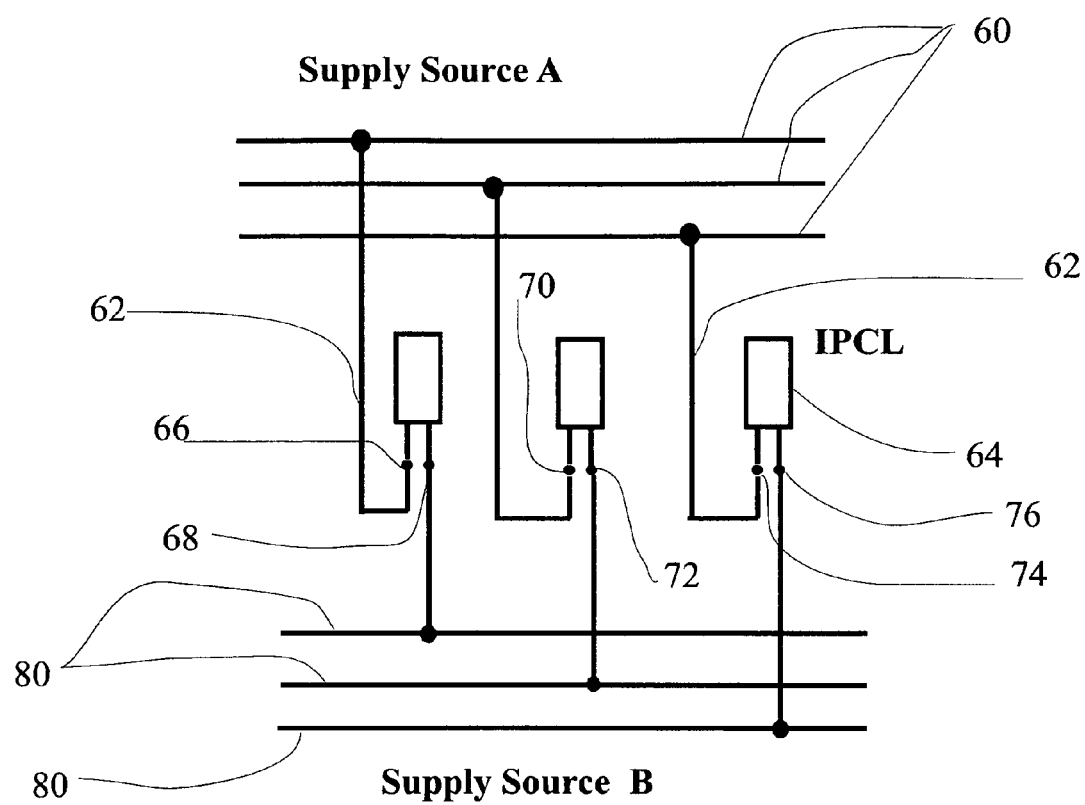
FIG. 6 illustrates the connection of the present invention as a current limiter at a bus tie line.

The test rig was modified by connecting the current proportional incremental permeability electromagnetic current limiter device (IPCL) between two supply sources 60 and 80 as shown in FIG. 6. Supply side terminals 66, 70 and 74 of the three phase current limiter device was connected to power source 60 and the load side terminals 68, 72 and 76 of the three phase current limiter device was connected to power source 80 as shown.

The unit was tested by introducing a sudden 100 amps load on power source 80 and the supply current condition of source 60 were recorded. The current on source 60 was found to increase only by 10 amperes.

This shows that the current limiter when inserted in a tie line limits the transfer loading between the lines in case of a sudden high current load in any one of the lines.

EXAMPLE 3

A 20 H.P three phase induction AC motor of 980 rpm rated speed and a starter was connected along with suitable arrangement for measuring current drawn by each of the three phases. The starting currents as recorded were 61 amps in each of the R Y B phases.

Figure 7:
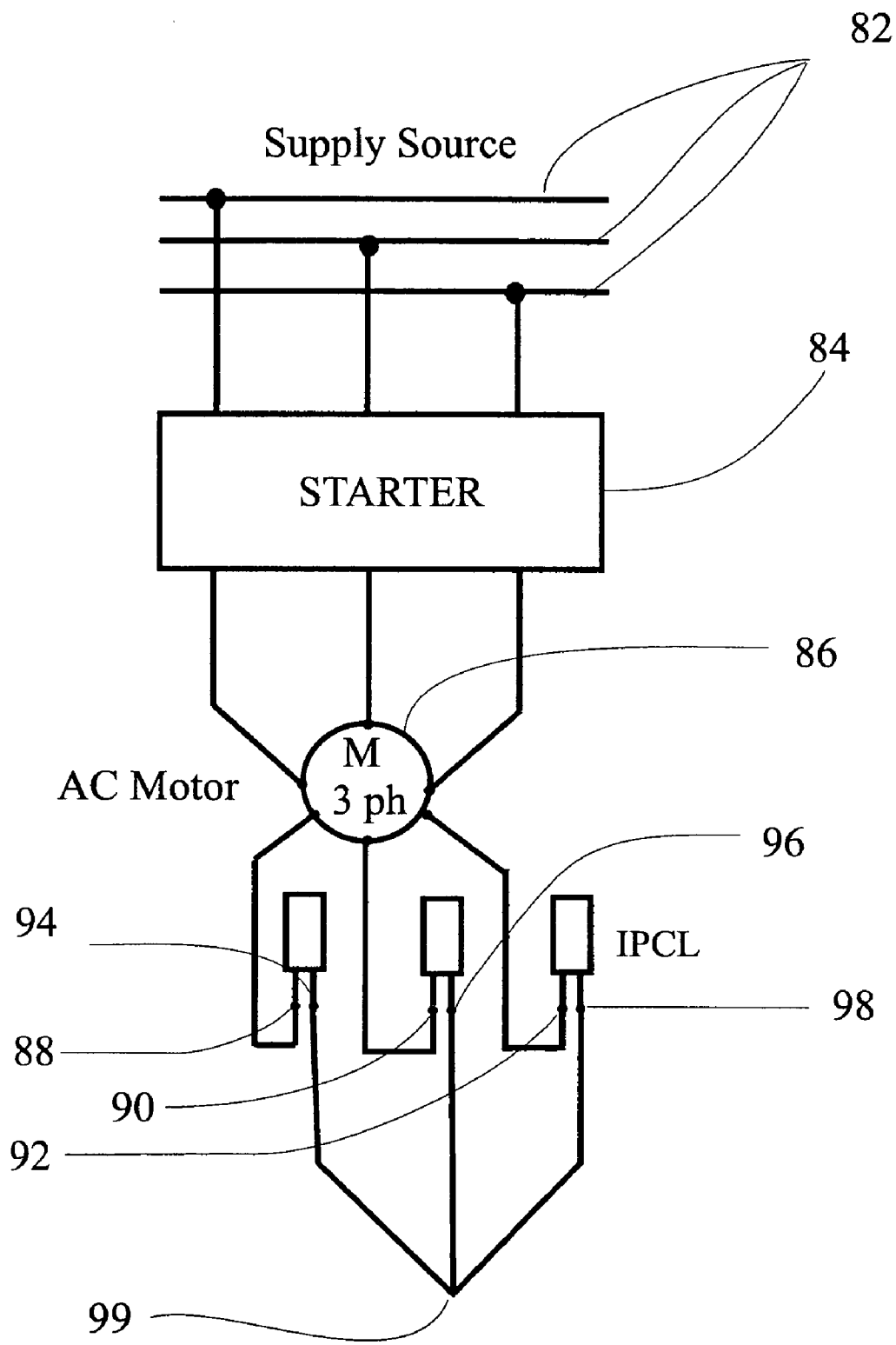
FIG. 7 illustrates (the neutral side connection of the present invention as a soft starter and) current limiter for AC motors.

A current limiter unit manufactured as per the present invention was connected to the test rig as a soft starter on the neutral side of a star connected motor as shown in FIG. 7.

The three phase supply source 82 was connected to one set of terminals of a starter 84 and the supply side terminals of the motor were connected to the other set of terminals of the starter 84. The neutral side terminals of the motor were connected to the terminals 88, 90 and 92 of the incremental permeability electromagnetic current limiter device (IPCL). The load side terminals of the current limiter device 94, 96 and 98 were connected to each other to form a star point 99. The starter 42 was switched on and the starting currents drawn by the three phases were noted down for a preset load condition of the motor. The starting currents as recorded were 30 amps in each of the three R Y B phases.

The test results clearly indicate that the starting current of the AC motor was limited by 50% percentage.

EXAMPLE 4

Test 1:

A Current limiter prototype of nominal current rating: 500 amps 6600 volts phase, 50 Hz was manufactured as per the present invention and no load short circuit testing was carried out with and without connecting the device at various voltage and the current drawn was tabulated.

| | S. No. | | | | | | |
|---|---|---|---|---|---|---|---|
| | 1 | 2 | 3 | 4 | 5 | 6 | 7 |
| Input voltage (Volts), 50 Hz (Vs) | 1100 | 2200 | 3300 | 4400 | 5500 | 6600 | 1100 |
| Short circuit current without current limiter (Isc) | 500 | 1000 | 1500 | 2000 | 2500 | 3000 | 500 |
| Source impedance Zs = (Vs/1.732)/Isc | 1.27 | 1.27 | 1.27 | 1.27 | 1.27 | 1.27 | 1.27 |
| Short circuit current with current limiter (IscL) | 490 | 600 | 700 | 800 | 900 | 1000 | 490 |
| Total impedance Zt = (Vs/1.732)/IscL | 1.3 | 2.12 | 2.72 | 3.2 | 3.53 | 3.81 | 1.3 |
| Current limiter impedance Zcl = Zt − Zs | 0.03 | 0.85 | 1.45 | 1.93 | 2.26 | 2.54 | 0.03 |
| Current limiting ratio CLR = Isc/IscL | 1.02 | 1.66 | 2.14 | 2.5 | 2.77 | 3 | 1.02 |

Graph of the no load short circuit testing with voltage plotted on X axis and current plotted on Y axis is shown in FIG. 8. Line 100 indicates the relative voltage and current of the short circuit test when the current limiter is not present in the circuit, where as line 102 indicates the relative voltage and current of the short circuit test when the current limiter is present in the circuit.

Test 2

Another current limiter prototype of nominal current rating: 400 amps 11000 volts 3 phase, 50 Hz was manufactured as per the present invention and short circuit testing was carried out with and without connecting the device at various voltage and the current drawn was tabulated.

|  | Sr no. | | | | | |
| --- | --- | --- | --- | --- | --- | --- |
|  | 1 | 2 | 3 | 4 | 5 | 6 |
| Input voltage (Volts), 50 Hz (Vs) | 210 | 420 | 6360 | 6600 | 11000 | 210 |
| Short circuit current without current limiter (Isc) | 400 | 800 | 12254 | 12720 | 21200 | 400 |
| Source impedance Zs = (Vs/1.732)/Isc | 0.3 | 0.3 | 0.3 | 0.3 | 0.3 | 0.3 |
| Short circuit current with current limiter IscL | 398 | 550 | 2000 | 2062 | 3000 | 398 |
| Total impedance Zt = (Vs/1.732)/IPCL | 0.304 | 0.44 | 1.838 | 1.85 | 2.12 | 0.304 |
| Current limiter impedance Zcl = Zt − Zs | 0.04 | 0.14 | 1.53 | 1.55 | 1.82 | 0.04 |
| Current limiting ratio CLR = Isc/IscL | 1.02 | 1.45 | 6.12 | 6.16 | 7.06 | 1.02 |

Graph of the no load short circuit testing with voltage plotted on X axis and current plotted on Y axis is shown in FIG. 9. Line 103 indicates the relative voltage and current of the short circuit test when the current limiter is not present in the circuit, where as line 104 indicates the relative voltage and current of the short circuit test when the current limiter is present in the circuit.

The current limiting feature of the device is evident from the graphs plotted in FIG. 8 and 9 for both the prototype units. From the reading as recorded above in test 1 & 2 it is shown that the current limiter impedance is proportional to the short circuit current. This clearly shows that the device exhibits incremental permeability with increasing short circuit current. The device limits the short circuit current instantaneously (typically within 10 milli-seconds) and also returns to lower levels of impedance instantaneously, with out having to be reset.

Test 3

Tests as above were repeated by connecting a motor of rated capacity 600 KW, 6 KV, 3ph, 50 Hz as an external load in the circuit, and results tabulated as below:

|  |  | OUTPUT CURRENT (AMPS) | |
| --- | --- | --- | --- |
| S. NO | INPUT VOLTAGE (Volts) | WITH THE CURRENT LIMITER DEVICE | WITHOUT THE CURRENT LIMITER DEVICE |
| 1 | 6000 V | 71 amps | 72 amps (Full load) |
| 2 | 6000 V | 200 amps | 430 amps (Starting) |
| 3 | 6000 V | 20 amps | 20 amps (No load) |
| 4 | 6000 V | 50 amps | 50.5 amps (Part load) |

The following inferences are drawn from the above data and graphs shown in FIGS. 8 and 9.

1. The current limiter has negligible impedance at current values equal to or less than the nominal current.
2. The current limiter impedance increases at higher current.
3. The increase in impedance is proportional to increase in current
4. The current limiting ratio i.e. "Current without limiter to current with limiter" (CLR) increases with current value.

Alternating currents up to rated (nominal) value pass through the winding with negligible voltage drop, but the high inductance and inductive reactance of the winding above the rated current, limit the current passing through the device upon starting, stalling of an AC motor or occurrence of a fault or overload condition in the circuit by providing a proportional increase in impedance between the alternating current source and the alternating current load.

Any increase in the winding current beyond the rated current increases the permeability and flux per unit current in the pre-aligned magnetic field defined in the soft ferromagnetic core to increase the inductance and inductive reactance of the winding till the soft ferromagnetic core saturates.

The property of incremental permeability in the soft ferromagnetic core is achieved by pre-alignment of the magnetic fields in the soft ferromagnetic core material in a direction perpendicular to the direction of flux produced in the core due to the passage of current in the winding.

While considerable emphasis has been placed herein on the specific structure of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A device comprising a core, a winging, an input terminal connected to a source of alternating current supplying alternating current to said winding and an output terminal, said device adapted to provide continuously incremental permeability in said core, proportional to the alternating current through said winding, resulting in a proportional inductance and inductive reactance and accordingly a proportional current limiter impedance, to limit the current to said output terminal, characterized in that:

said core is at least one uniform silicon steel body having a central opening and a plurality of magnetic domains, all of said magnetic domains being pre-aligned radially outward and inward and intended to carry an induced circumferential magnetic field resulting in a magnetic flux around said central opening in said body; said incremental permeability being incrementally proportional to said circumferential magnetic field, said incremental permeability being low for low magnetic field strength in a circumferential direction and increasing with higher magnetic field strength; and said winding being the only coil in said device and being an electrically conducting material wound on said core;

a portion of said winding passing through said opening.

2. A device as claimed in claim 1, wherein said winding is adapted to induce said circumferential magnetic field in said core having said magnetic domains, characterized in that the permeability of said core is incrementally proportional to said circumferential magnetic field resulting in a non linear increment of said magnetic flux.

3. A device as claimed in claim 1, wherein said circumferential magnetic field induced by said winding is concentric to said opening.

4. A method of manufacturing an electromagnetic current limiter device as claimed in claim 1 comprising the following steps:
  a. providing a core having a uniform silicon steel body and a central opening;
  b. aligning all of the magnetic domains of the body of said core radially around said opening;
  c. winding an electrically conductive element through said opening in said core for a predetermined number of turns to thereby form a winding; and
  d. providing an input terminal and an output terminal for said winding.

5. A device as claimed in claim 1, wherein said device is not dependent on conductivity of said winding to limit the current to said output terminal.

6. A device as claimed in claim 1, wherein said device is operable at ambient temperature.

7. A device as claimed in claim 1, wherein said device is adapted to provide continuously incremental permeability throughout all of said core.

8. A device as claimed in claim 1, wherein each of said pre-aligned magnetic domains is defined between a respective portion of said core defining said central opening and a respective portion of said core defining an outer surface of said core.

* * * * *